No. 690,269. Patented Dec. 31, 1901.
D. L. GRISWOLD.
LAWN MOWER.
(Application filed Mar. 11, 1901.)

(No Model.)

Witnesses

Inventor:
Dexter L. Griswold
By Eden Ross
Attorneys

UNITED STATES PATENT OFFICE.

DEXTER L. GRISWOLD, OF WALTON, NEW YORK, ASSIGNOR OF ONE-HALF TO JACOB E. KEMMERER, OF SCRANTON, PENNSYLVANIA.

LAWN-MOWER.

SPECIFICATION forming part of Letters Patent No. 690,269, dated December 31, 1901.

Application filed March 11, 1901. Serial No. 50,553. (No model.)

*To all whom it may concern:*

Be it known that I, DEXTER L. GRISWOLD, a citizen of the United States, residing at Walton, in the county of Delaware and State of New York, have invented certain new and useful Improvements in Lawn-Mowers; and I do hereby declare the following to be a full, clear, and exact description of the invention, such as will enable others skilled in the art to which it appertains to make and use the same.

My invention relates to improvements in lawn-mowers.

It has for its object to greatly promote simplicity, expedite the cutting or mowing action, lessen cost of manufacture, and otherwise add to its utility, convenience, and facility of operation.

It consists of certain novel features of construction and of the combination and arrangement of the parts, substantially as hereinafter more fully disclosed, and specifically pointed out by the claim concluding the specification proper.

Figure 1:
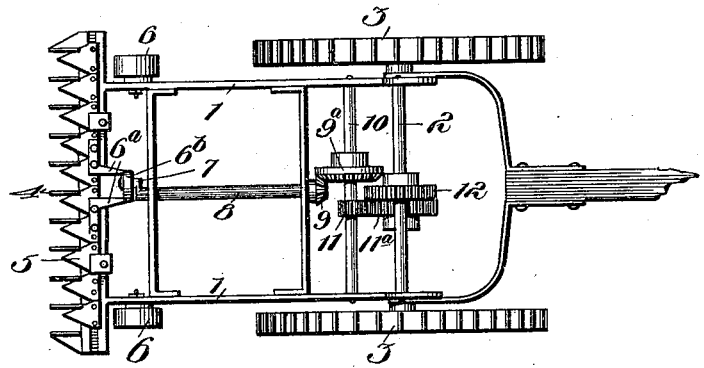
Figure 2:
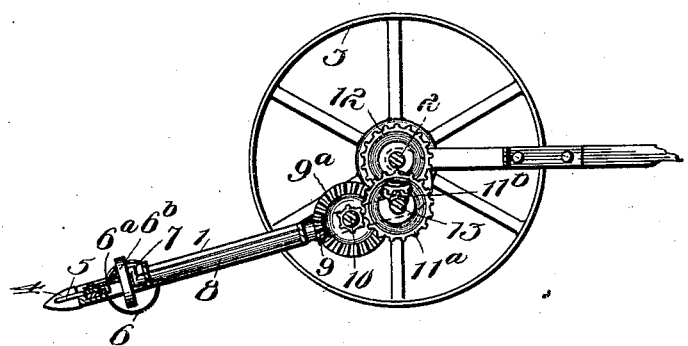
Figure 3:
Figure 4:
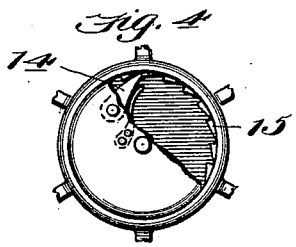

In the accompanying drawings, illustrating the preferred embodiment of my invention, Figure 1 is a plan view. Fig. 2 is a longitudinal section. Fig. 3 is a cross-section more fully disclosing the cutter or knife bar reciprocating cam arrangement. Fig. 4 is a detached broken-away view of the axle and driving-wheel ratchet-and-pawl connection.

Latitude is allowed herein as to details, as they may be changed or varied at will without departing from the spirit of my invention and the same yet remain intact and be protected.

In carrying out my invention I provide a suitable frame 1, preferably, as shown, with a handle in practice attached to its rear elevated or upturned end and itself suitably supported or suspended from an axle 2, carried by driving or transporting wheels 3 3. Said frame carries at its forward end a finger-bar 4 of the usual construction, and upon this finger-bar is borne the knife-bar 5, whose cutters or knives are reciprocated under overhanging guards of said finger-bar to cut or mow the grass received between the fingers of said finger-bar as the device is pushed along the lawn. This end of said frame is suitably supported by small wheels or trucks 6, whose axles are applied laterally to said frame.

To the cutter or knife bar 5 about centrally are fixed the forward ends of the arms $6^a$ of an elliptical ring-like cam $6^b$, arranged rearward of the knife-bar, and with this cam engages an eccentric or crank 7, carried by the forward end of a shaft 8 to impart the requisite reciprocating action to said knife-bar in effecting the cutting or mowing action.

The shaft 8, supported in cross-pieces of the frame 1, is driven, preferably, by multiple gearing 9 $9^a$, carried by an axle 10 and intergeared gearing 11, $11^a$, $11^b$, and 12, carried by the driving-wheel axle 2 and axle 13, respectively, said axles 10 and 13 being also mounted in said frame. The transmittal of motion from the driving-wheels to their axle, which in turn transmits motion to said gearing, is effected by a pawl-and-ratchet arrangement 14 15, as shown, when the mower is moved forward. When, however, the movement of the mower is reversed, the ratchet and pawl will not be effective, consequently providing for throwing the cutter-bar out of action.

Having thus fully described my invention, what I claim, and desire to secure by Letters Patent, is—

In a lawn-mower, the combination with the cutter-bar, and a crank-shaft, of an elliptical ring-like cam having opposite arms extending forward from one side thereof and secured at their forward ends to said cutter-bar, upon its upper surface, substantially as set forth.

In testimony whereof I affix my signature in presence of two witnesses.

DEXTER L. GRISWOLD.

Witnesses:
C. A. ROGERS,
J. C. MCCLELLAND.